United States Patent [19]

Bryington, II

[11] 4,441,747
[45] Apr. 10, 1984

[54] SEPARABLE TOOL

[76] Inventor: Clayton W. Bryington, II, P.O. Box 78, Gaines, Pa. 16921

[21] Appl. No.: 380,718

[22] Filed: May 21, 1982

[51] Int. Cl.³ .............................................. F41C 27/04
[52] U.S. Cl. ..................................................... 294/51
[58] Field of Search ..................... 294/51, 50, 52, 50.9, 294/55.5, 59, 49; 172/371, 372, 373, 374, 375, 380, 381; 56/400.04, 400.05, 400.06, 400.07

[56] References Cited

U.S. PATENT DOCUMENTS 208,749  10/1878  McConn ................................ 294/51

FOREIGN PATENT DOCUMENTS 1964087  12/1969  Fed. Rep. of Germany ........ 294/51

Primary Examiner—James B. Marbert
Attorney, Agent, or Firm—Arthur L. Urban

[57] ABSTRACT

A separable tool including a handle portion, a working portion and a connector portion; the handle portion including an elongated member, the elongated member including a gripping section adjacent one end of the elongated member and a male section adjacent the opposite end of the elongated member, the male section including a plurality of recesses along the length thereof; the working portion including a tool member; the connector portion including a socket section extending from one end of the tool member, the socket section having a diameter slightly larger than the male section of the handle portion and including longitudinal slots along the length thereof, strip sections disposed within the socket section adjacent each of the longitudinal slots and generally aligned therewith, the strip sections extending beyond the ends of the longitudinal slots, one end of each strip section being affixed to the socket section adjacent to the open end of the socket section, a button member slidably contacting each strip section, the button member including a base section adjacent the strip section and a finger-contacting section extending outwardly through the adjacent longitudinal slot, a spring located adjacent the end of the strip section remote from the open end of the socket section, the spring urging the strip section toward the longitudinal slot, protrusions affixed to each strip section along the length thereof extending from the section on the side remote from the socket section, the protrusions being spaced longitudinally along the length of the strip section with the same spacing as the spacing between the male section recesses.

7 Claims, 6 Drawing Figures

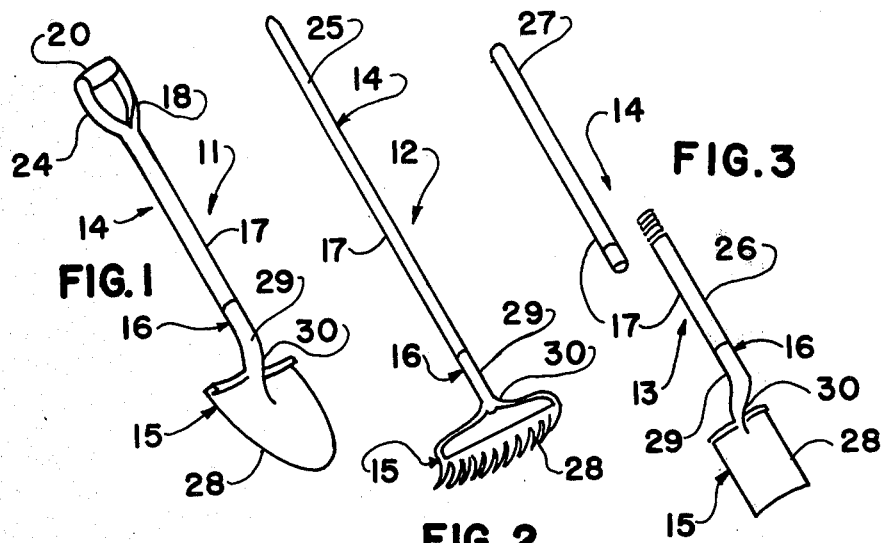
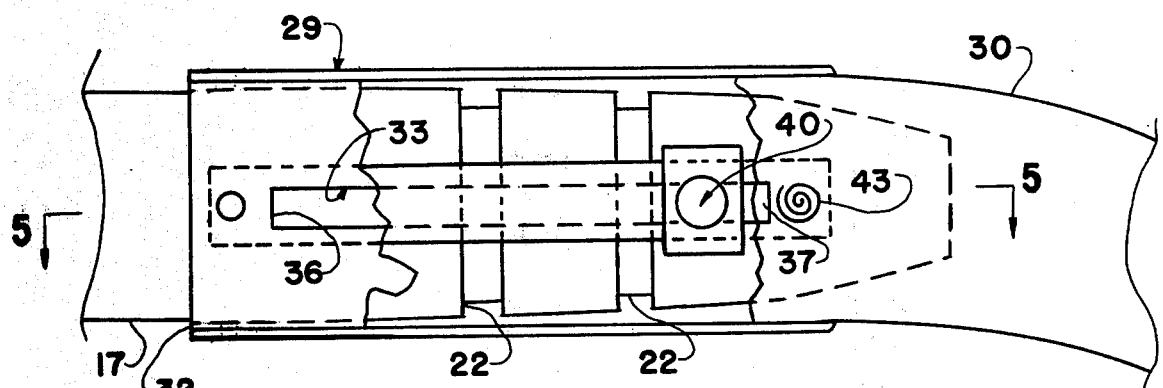
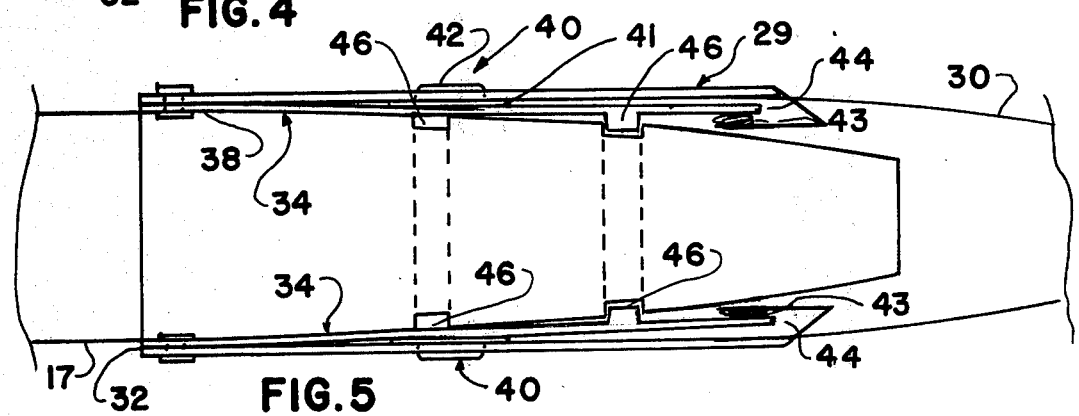
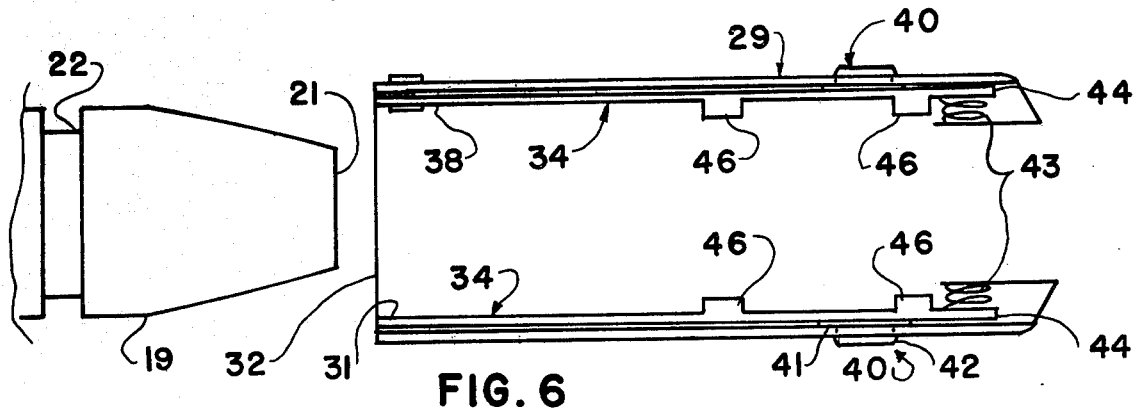

SEPARABLE TOOL

This invention relates to a novel tool and more particularly relates to a new tool that can be separated into its components.

Tools have been employed throughout history to provide assistance in performing a variety of tasks. Originally, simple tools were used to dig holes, to construct shelters and the like.

Through the years, many different tools have been developed. Most have been refinements of the basic tools employed for centuries, e.g. shovels, hammers, etc. These refinements frequently incorporate slight changes in the working element of the tool or new structural materials.

One class of tools on which considerable design variations have evolved is garden tools. It is readily apparent to any visitor to a garden supply shop that many different shovels, rakes, hoes, etc. are available to serve the needs and desires of the buying public. Some tools have smaller or larger work elements, handles and the like. Others are made of lighter weight materials.

In spite of the variations in design, most garden tools have a rigid handle affixed to a work element. Thus, a family may have to acquire several of the same tool in order that each family member can perform a task efficiently and conveniently. For example, a man may use a large shovel, while his wife may find that shovel too heavy and cumbersome to use so she has a smaller shovel. If children are relatively young, both their mother's and their father's shovels may be too large and they would only feel comfortable with a shovel of still smaller size. Likewise, a family member may be frail and/or in poor health and may be unable to handle a normal size shovel.

Another area of use that may require a special shovel is a situation in which the user is working in a closely confined space. It may not be possible to use a normal size tool without bumping into surrounding obstacles. This can seriously inhibit progress on the task.

Many people place a high value on their gardens, whether they be purely ornamental such as flowers and shrubs or a vegetable garden that supplies them with food. As a result, they may be willing to spend considerable sums on tools that they believe are necessary or desirable for a quality garden. If persons are unwilling or unable to purchase a variety of the same tool item, they or members of their family may be forced to use a tool that is not suited to their stature or the specific job situation.

From the above discussion, it is clear that presently available tools do not provide a satisfactory solution in situations frequently encountered by many persons. Thus, there is a need for a new tool that overcomes the shortcomings of present tools.

The present invention provides a novel tool with advantages and benefits not found in tools currently available. The tool of the present invention can be used conveniently by persons of widely differing statures and strengths.

The tool of the present invention can be adapted quickly and easily to function in a wide variety of different tasks. The tool can function as a shovel, rake, hoe or another tool. The tool also can be modified easily to facilitate use by different persons.

The garden tool of the invention is simple in design and relatively inexpensive. The tool can be fabricated from commercially available materials and components. The tool can be manufactured using conventional industrial tool fabrication techniques and procedures.

The tool of the present invention is durable in construction and has a long useful life. Little, if any, maintenance is required to keep the tool in operating condition.

The tool of the invention can be assembled in a few minutes by persons with limited mechanical aptitude or experience after only a minimum of instruction. The tool can be stored in a relatively small space.

These and other benefits and advantages of the novel tool of the present invention will be apparent from the following description and the accompanying drawings in which:

FIG. 1 is a view in perspective of one form of a pointed shovel with a D-shaped handle of the invention in an assembled condition;

FIG. 2 is a view in perspective of one form of a rake with a long handle of the invention in an assembled condition;

FIG. 3 is a view in perspective of one form of a square shovel with a sectional handle of the invention in an assembled condition.

FIG. 4 is an enlarged fragmentary side view of the shovel shown in FIG. 1;

FIG. 5 is a sectional view taken along line 5—5 of FIG. 4, and

FIG. 6 is a sectional view of the fragmentary portion shown in FIG. 5 with components separated.

As shown in the drawings, a pointed shovel 11, a rake 12 and a square shovel 13 of the present invention each includes a handle portion 14, a working portion 15 and a connector portion 16.

The handle portion 14 of the tools 11–13 of the invention includes an elongated member 17. The elongated member 17 includes a gripping section 18 and a male section 19. The gripping section 18 is disposed adjacent one end 20 of the elongated member 17.

The male section 19 is located adjacent the end 21 of the elongated member 17 opposite to gripping end 20. The male section 19 includes a plurality of recesses 22 along the length thereof. The recesses 22 preferably are annular recesses. The end 21 of the male section 19 is tapered.

The elongated member 17 may take a variety of forms. As shown in FIG. 1, pointed shovel 11 includes a D-handle 24. In FIG. 2, rake 12 has a straight long handle 25. The elongated member 17 of square shovel 13 shown in FIG. 3 is separable into more than one section, namely sections 26 and 27. This latter configuration enables the tool 13 to be broken down into a number of small components which can be stored conveniently in a relatively small space or container.

The working portion 15 of the separable tools 11–13 includes a tool member 28. The tool member 28 may be any of a wide variety of different work implements. The tool member 28 may be a pointed shovel as shown in FIG. 1, a rake (FIG. 2) or a square shovel (FIG. 3). Also, the tool member 28 may be a hoe or some other work element, either one that is already known and used or an entirely new work element.

The connector portion of the tools 11–13 includes a socket section 29 which extends from one end 30 of the tool member 28. The socket section 29 has an opening 31 in the free end 32 thereof. The socket section 29 has a diameter slightly larger than the male section 19 of the handle portion 14.

The connector portion 16 also includes longitudinal slots 33. The longitudinal slots 33 are disposed along the length of the socket section 29. The longitudinal slots 33 advantageously are disposed opposite or across from one another in the socket section 29. This facilitates assembly of the tool.

The connector portion 16 further includes strip sections 34 disposed within the socket section 29. The strip sections 34 are aligned longitudinally of the socket section. One of the strip sections 34 is disposed adjacent each of the longitudinal slots 33 and is generally aligned with the slot. The strip sections 34 extend beyond the ends 36 and 37 of the longitudinal slots 33. One end 38 of each strip section 34 is affixed to the socket section 29 adjacent to the socket opening 31.

A button member 40 slidably contacts each strip section 34. The button member 40 includes a base section 41 adjacent the strip section. The button member 40 also includes a finger-contacting section 42. The finger-contacting section 42 extends outwardly through the longitudinal slot 33.

Biasing means, preferably coil springs 43 as shown, are disposed in contact with each of the strip sections 34. Each of the springs 43 is located adjacent the end 44 of the strip section 34 remote from the socket opening 31. The biasing means urges the strip section 34 toward the longitudinal slot 33.

Protrusions 46 are affixed to each strip section 34 along the length thereof. The protrusions 46 extend from the strip section 34 on the side thereof remote from the socket section 29. Thus, the protrusions extend inwardly toward each other. The protrusions 46 are spaced longitudinally along the length of the strip section 34. The protrusions preferably have a cross-sectional configuration with four sides. Each side is disposed at right angles to adjacent sides such as a square or rectangle. The spacing between the protrusions along the strip sections 34 is the same as the spacing between the recesses 22 of the male handle section 19. The spacing is the same so the protrusions 46 on the strip sections 34 will engage the recesses 22 of the male member and secure the handle portion 14 to the working portion 15.

In the use of the novel tools 11–13 of the present invention, the tools first are assembled since ordinarily they are stored in a separated condition, that is, the handle portion 14 would be separate from the working portion 15. This arrangement enables the tool to be stored or transported in a small package. Also, it allows the tool to be placed into spaces not big enough for a conventional one piece tool.

The handle portion 14 is attached to the working portion 15 through connector portion 16. The male section 19 of the handle portion 14 is inserted into the socket section 29 of the working portion 15. To secure the handle 14 to tool member 28, the protrusions 46 on the strip sections 34 are positioned into the recesses 22 in the male section 19.

When the protrusions are properly aligned with the recesses 22, the assembly is locked in place. This is accomplished by sliding button members 40 upwardly toward the handle portion 14. The movement of the bottom member 40 is accomplished by sliding the finger-contacting sections 42 of the button member along longitudinal slits 33 in the socket section 29.

Since the base section 41 of the button member 40 bears against the strip section 34 and the upper end of the strip section is affixed to the socket section 29, the movement of the button member 40 causes the strip section to overcome the biasing force of spring 43. As a result, the strip section is pushed against the male section 19 which locks the protrusions in the recesses 22. The tool now is ready for use in the same way as a conventional tool.

When it is desired to store the tool or to change to a different tool member 28 or a different handle portion 14, the above procedure is reversed. The button members 40 are slid to the opposite end of the longitudinal slots 33, that is, the end 37 closer to the tool member 28. With the button members 40 in this position, springs 43 urge the strip sections 34 toward the sidewall of the socket section 29 and away from the male section 19.

This movement of the strip sections 34 causes the protrusions 46 affixed thereto to withdraw from recesses 22. The male section 19 thus is freed so that the handle portion 14 can be separated from the working portion 15. With the components separated, either the tool member 28 can be replaced with another of a different design and/or a different handle portion can be substituted.

In this way, the tool of the invention can be modified to perform a different task such as raking or hoeing instead of digging. Alternatively, the tool can be modified with a different handle portion for use by another person who has different strength capability or working in a confined space. In any case, one tool can be modified to serve a wide variety of differing tasks.

The above description and the accompanying drawings show that the present invention provides a novel tool with advantages not found in tools currently available. The tool of the present invention can be used conveniently by persons of differing ages and strength potential.

The tool of the invention can be modified to perform a wide variety of different tasks. The tool can function as a shovel, rake, hoe or a similar tool. The tool also can be modified to adapt for use by different persons.

The tool of the present invention is simple in design and can be produced relatively inexpensively. The tool can be fabricated from commercially available materials and components employing conventional tool manufacturing techniques and procedures.

The tool can be assembled and disassembled easily and quickly after only a minimum of instruction. The tool can be stored and transported in significantly smaller spaces as compared with conventional one piece tools. The tool is durable in construction and has a long useful life with a minimum of maintenance.

It will be apparent that various modifications can be made in the particular tool described in detail and shown in the drawings within the scope of the invention. The size, configuration and arrangement of components may be different to meet specific requirements. Also, the tool can be fabricated from a variety of materials including metals, wood, plastics and the like. These and other changes can be made in the tool of the invention provided the functioning and operation of the tool are not adversely affected. Therefore, the scope of the invention is to be limited only by the following claims.

What is claimed is:

1. A separable tool including a handle portion, a working portion and a connector portion; said handle portion including an elongated member, said elongated member including a gripping section adjacent one end of said elongated member and a male connecting section adjacent the opposite end of said elongated member, said male section including a plurality of annular recesses along the length thereof, said male section including a tapered end section; said working portion including a plurality of tool members with different configurations and the same connector portion configuration, each of said tool members being interchangeably connectable with said male connecting section of said handle portion; said connector portion including a socket section extending from one end of said tool member, said socket section having a diameter slightly larger than said male section of said handle portion, said socket section including a pair of opposed longitudinal slots along the length thereof, strips sections disposed within said socket section, said strip sections being aligned longitudinally of said socket section, one of said strip sections being disposed adjacent each of said longitudinal slots and generally aligned therewith, said strip sections extending beyond the ends of said longitudinal slots, one end of each strip section being affixed to said socket section adjacent to the open end of said socket section, a button member slidably contacting each strip section, said button member including a base section adjacent said strip section and a finger-contacting section extending outwardly through the adjacent longitudinal slot, biasing means disposed in contact with each of said strip sections, each biasing means being located adjacent the end of said strip section remote from said socket section, said biasing means urging said strip section toward said longitudinal slot, protrusions affixed to each strip section along the length thereof, said protrusions extending from said strip section on the side thereof remote from said socket section, said protrusions being spaced longitudinally along the length of said strip section with the same spacing as the spacing between said recesses of said male handle section for engagement therewith.

2. A separable tool according to claim 1 wherein said elongated handle member is separable into more than one section.

3. A separable tool according to claim 1 wherein said protrusions have a cross-sectional configuration with four sides and each side being disposed at right angles to adjacent sides.

4. A separable tool according to claim 1 wherein said biasing means includes a plurality of coil springs.

5. A separable tool according to claim 1 including a plurality of handle portions with different gripping section configurations and the same male section configuration, each of said handle portions being interchangeably connectable with said connector portion and said working portion.

6. A separable tool according to claim 1 wherein said tool member is a garden tool.

7. A separable tool according to claim 6 wherein said garden tool is a shovel, a rake or a hoe.

* * * * *